United States Patent
Boltrek et al.

[15] 3,677,388
[45] July 18, 1972

[54] MODULAR DRIVE UNIT FOR A CONVEYOR

[72] Inventors: Henry Boltrek, Freeport, N.Y.; Joseph K. Kraft, Verona, N.J.

[73] Assignee: Westinghouse Electric Corporation, Pittsburgh, Pa.

[22] Filed: Nov. 23, 1970

[21] Appl. No.: 91,959

[52] U.S. Cl.................................................198/16, 198/203
[51] Int. Cl..........................................B65g 23/16, B66b 9/12
[58] Field of Search.........................................198/16–17, 18, 198/203; 74/219; 104/25

[56] References Cited

UNITED STATES PATENTS 1,988,421   1/1935   McCann..............................74/219 X

FOREIGN PATENTS OR APPLICATIONS 272,016    6/1927    Great Britain..........................198/18
6,612,032  10/1967   Netherlands............................198/16

Primary Examiner—Edward A. Sroka
Attorney—A. T. Stratton, C. L. Freedman and R. V. Westerhoff

[57] ABSTRACT

A multiple strand driving chain is lifted into engagement with teeth carried on the endless belt of a conveyor by sprocket wheels which straddle the teeth. Preferably such multiple strand driving chains are incorporated into a modular drive unit where they are urged into engagement with the teeth on the top and bottom runs on both sides of the endless belt. Additionally, the teeth on the endless belt may be provided with a negative pitch angle whereby the multiple strand chain is drawn into and retained in engagement with the teeth on the endless belt throughout the distance between the sprocket wheels. The multiple strand driving chains are longitudinally adjustable with respect to the teeth on the moving belt.

19 Claims, 9 Drawing Figures

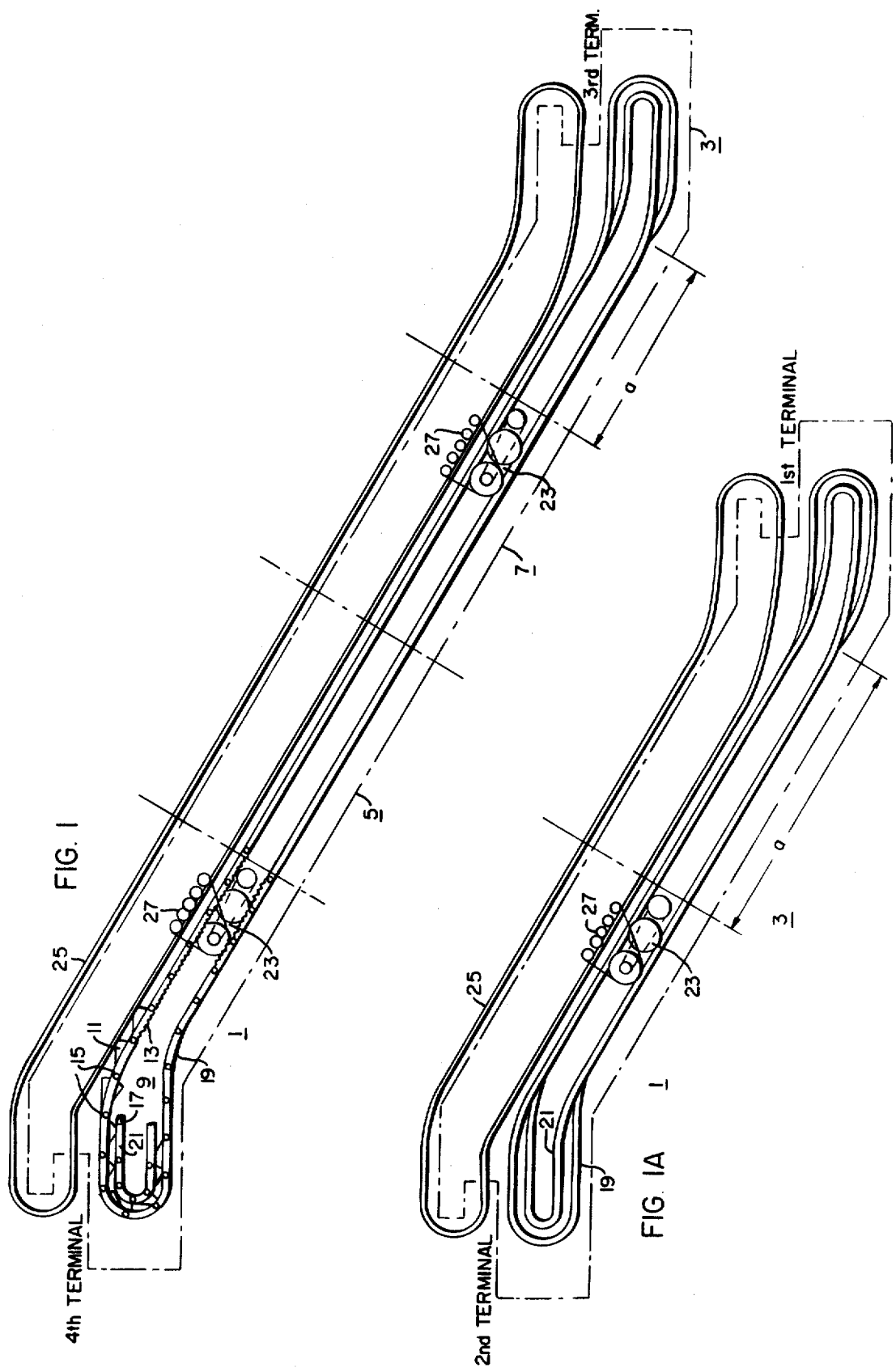

MODULAR DRIVE UNIT FOR A CONVEYOR

CROSS-REFERENCES TO RELATED APPLICATIONS

Application Ser. No. 91,960 filed Nov. 23, 1970, entitled "Apparatus For Guiding A Conveyor", filed concurrently herewith in the name of Joseph K. Kraft and assigned to the same assignee as this application.

Application Ser. No. 91,846 filed Nov. 23, 1970, entitled "Modular Passenger Conveyor Construction", filed concurrently herewith in the names of Joseph K. Kraft and Henry Boltrek and assigned to the same assignee as this application.

BACKGROUND OF THE INVENTION

1. Field of the Invention

This invention relates to chain drives for conveyors especially to palletized conveyors such as moving stairways and walks utilized for transporting passengers.

2. Description of the Prior Art

It has long been the practice to drive moving stairways and walks through large sprocket wheels located normally at the upper end of the conveyor run and acting through a chain connecting the steps or pallets. Other types of drives which engage the conveyor at intermediate points have been proposed from time to time such as that shown in U.S. Pat. No. 950,796 where the steps of a moving stairway are driven on both the upper and lower runs by a sprocket wheel located near the upper end of the inclined portion through toothed links joining the steps. Timing belt drives such as those shown in U.S. Pat. Nos. 3,191,743 and 3,365,051 are also in use. U.S. Pat. No. 3,107,773 teaches the use of an intermediate chain drive on a moving stairway while French Pat. No. 1,196,764 suggests the use of a number of intermediate chain drives engaging both the upper and lower runs of a moving stairway. The chain drives of the prior art require slider beds to lift the chain from a sprocket wheel into engagement with the racks on the steps and to maintain these parts in engagement for the desired distance. Slider beds are noisy and cause wear on the chain. Another disadvantage of prior art chain drives is that they also require tensioning of the chain.

Multiple strand chains have been used in many applications. U.S. Pat. No. 951,721 teaches the use of a double slider bed acting against the outer strands of a three strand chain to lift the center strand into engagement with a sprocket wheel.

SUMMARY OF THE INVENTION

According to this invention a drive chain is lifted into engagement with the teeth on an endless belt by sprocket wheels which straddle the teeth. Adjacent strands of a multiple strand driving chain engage either the sprocket wheels or the teeth on the endless belt. Various combinations of rows of teeth alternating with sprocket wheels could be employed, however, in the preferred embodiment of the invention, a pair of sprocket wheels supporting each end of the drive chain loop straddle a single row of teeth on the endless belt. The outer strands of a three strand drive chain engage the sprocket wheels which lift the center strand into engagement with the teeth on the endless belt. The pitch of the various strands of the drive chain may be the same, however, in the embodiment of the invention illustrated, the pitch of the center strand which engages the teeth on the endless belt is twice that of the outer strands which engage the sprocket wheels. With this configuration, large rollers of resilient material which distribute the load more evenly between the rollers in engagement with the teeth and which reduce chatter can be provided on the center strand.

According to another aspect of this invention, the teeth on the endless belt are provided with a negative pitch angle which tends to draw the drive chain into engagement with the teeth and retain it in engagement over the entire range of travel between the sets of sprocket wheels. This combination of the overlapping sprocket wheels and the negative pitch angle on the teeth on the endless belt eliminates the need for slider beds and a tensioning device for the drive chain. The resilient rollers on the center strand of the drive chain assist in engaging and disengaging the drive chain from the teeth on the endless belt with the negative pitch angle.

Preferably the drive unit is in the form of a modular unit which can be inserted at selected points along the run of the endless belt. Also preferably, the drive unit should be located at points where the load bearing and return runs are parallel to each other so that by locating the axles of the sprocket wheels halfway in between, the sprocket wheels can be made to straddle the teeth on the upper and return runs. With a row of teeth on each side of the endless belt, drive chains supported by sprocket wheels can engage the endless belt on the top and bottom runs on both sides. Alternatively, a single drive chain can be used to engage a centrally located row of teeth on the endless belt.

Preferably the modular drive unit is mounted on a frame which includes sections of track which guide the endless belt whereby the unit may be easily and accurately aligned with the endless belt. Additionally the sprocket wheels are longitudinally adjustable with respect to the frame so that when a plurality of modular drive units are utilized on the same endless belt each of the units may be properly aligned to engage the teeth on the endless belt. Since it is also desirable that the sprocket wheels supporting each strand be adjustable with respect to each other to take up slack in the chain, in the preferred embodiment of the invention the idler sprockets are mounted on a plate which is slidable with respect to a second plate on which the drive sprocket is mounted. The second plate which carries both the idler and drive sprockets is slidable with respect to the frame so that the entire coupling may be adjusted longitudinally as a unit. The drive motor is similarly mounted on a plate which is slidable with respect to another plate on which the gear reducer is mounted so that the belt drive for the gear reducer may be kept in tension. The other plate carrying both the drive motor and the gear reducer is slidably adjustable with respect to the frame as are the sprocket wheels.

BRIEF DESCRIPTION OF THE DRAWINGS

FIG. 1 is a schematic side elevation view of a moving stairway embodying the invention;

FIG. 1a is a schematic side elevation view of another moving stairway according to the invention;

DESCRIPTION OF THE PREFERRED EMBODIMENT OF THE INVENTION

Figure 3:
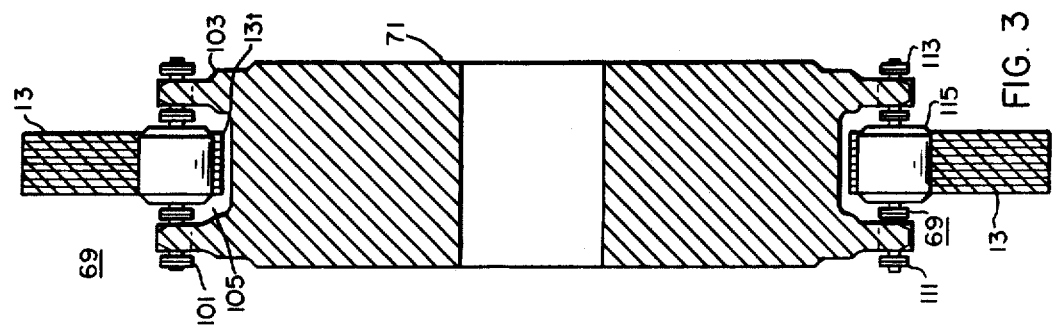
FIG. 3 is a sectional view taken along line II—II in FIG. 2.

The invention will be described as applied to a moving stairway of the type disclosed in our copending application mentioned above, however, it is to be understood that the concepts herein disclosed are equally applicable to other types of conveyors. FIG. 1 illustrates a moving stairway having a supporting structure which includes an upper terminal module 1, a lower terminal module 3 and intermediate modules 5 and 7. An endless belt 9 is composed of a series of steps 11 which are pivotally connected by toothed links 13. The steps are supported by main rollers 15 and trailer rollers 17 which cooperate with main tracks 19 and trailer tracks 21 on the modules to guide the steps in their endless path as is well known in the stairway art. The steps are driven in their endless path by modular drive units 23 which engage the teeth on the toothed links on either side of the steps. Handrails 25 on either side of the steps are driven by handrail drive units 27 which are part of the modular drive units 23. As was described in our copending application, any number of stairway modules, some with and some without modular drive units 23, may be assembled to fit the requirements of a particular installation. The variable section of the bottom terminal module 3 is variable up to the full length of one of the intermediate modules. FIG. 1a illustrates a stairway which includes only the upper terminal module 1 with a drive unit and a lower terminal module 3 with the variable section a being at the maximum length.

Figure 2:
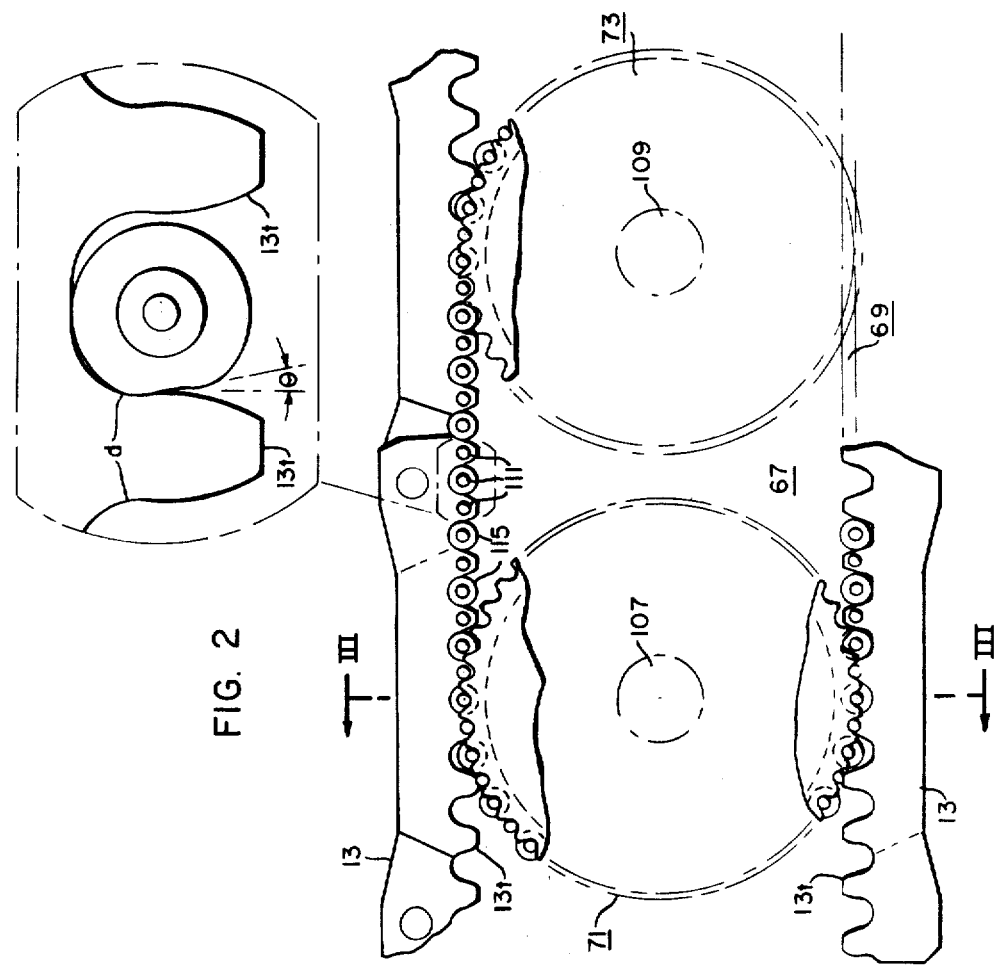
FIG. 2 is a side view with some parts enlarged of a portion of a drive coupling according to the invention.

FIGS. 2 and 3 illustrate a drive coupling 67 which includes a driven sprocket wheel 71 and an idler sprocket wheel 73 which support a triple stranded chain 69. The sprocket wheels 71 and 73 are drums which carry two rows of sprocket teeth 101 and 103 axially displaced by an annular groove 105. The axles 107 and 109 of the sprocket wheels 71 and 73 respectively, are oriented so that the rows of sprocket teeth 101 and 103 straddle the toothed links 13 carried by the endless belt with the teeth 13t of the links 13 extending into the annular groove 105 on the sprocket wheels. Preferably the axles 107 and 109 are located halfway between the locations of the toothed links 13 on the upper and lower runs of the endless belt so that the rows of sprocket teeth overlap the teeth on the toothed links on both runs. The triple stranded chain 69 has outer strands 111 and 113 of conventional steel roller chain which engage the rows of sprocket teeth 101 and 103 on the sprocket wheels 71 and 73. The center strand 115 has a pitch twice that of the outer strands 111 and 113 and is provided with large resilient rollers in place of steel rollers. Polyurethane has been found to be a suitable resilient material for these rollers. The rollers of the center strand 115 are lifted into engagement with the teeth 13t on the toothed links by the overlapping sprocket teeth on the sprocket wheels. As can be seen from the enlargement in FIG. 2, the dedendum $d$ of the teeth 13t on the links 13 is undercut to form a negative pitch angle $\theta$. This negative pitch angle tends to draw the rollers on the center strand of the drive chain 69 into engagement with the teeth on the links and maintains them in engagement until they are extracted by the other sprocket wheel at the end of the chain loop.

This combination of the overlapping sprocket wheels and the negative pitch angle on the link teeth eliminates the need for slider beds to urge and maintain the chain and links in contact. The negative pitch angle need only be sufficient to overcome the weight of the catenary of the chain between the sprocket wheels and an angle of 5° has been found to be satisfactory. The use of resilient rollers on the center strand of the drive chain reduces the chatter, helps distribute the load over several teeth on the links and smoothes the entrance and exit of the chain rollers into the recessed dedendum of the link teeth. Although a sprocket wheel with two rows of sprocket teeth is shown engaging a link with one row of teeth, other combinations of rows of sprocket teeth and link teeth would be within the spirit of the invention. Likewise, other combinations of the ratio of the pitch between the strands engaging the sprocket teeth and the rack teeth could be utilized.

Figure 4:
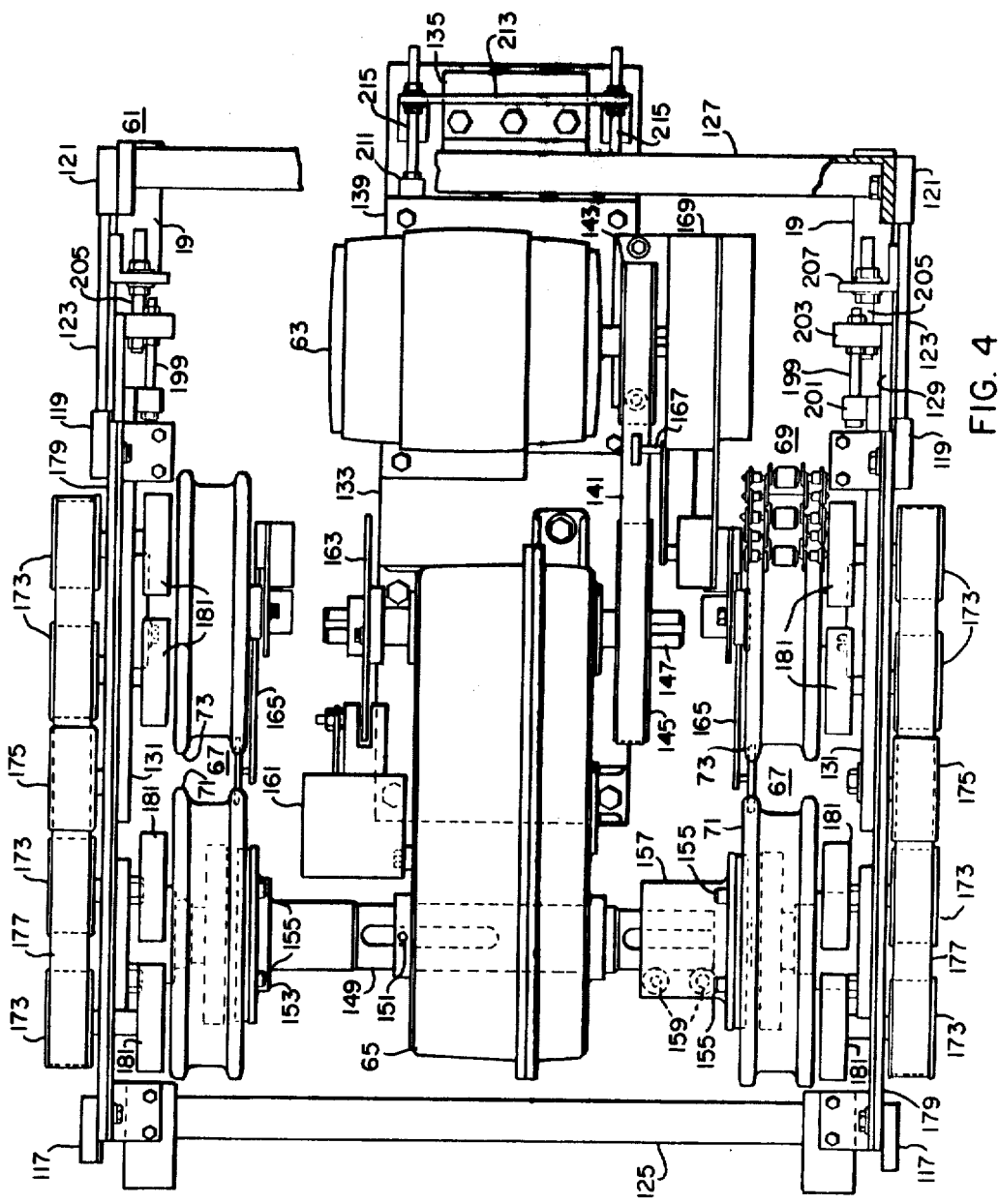
FIG. 4 is a plan view of a modular drive unit embodying the invention.
Figure 5:
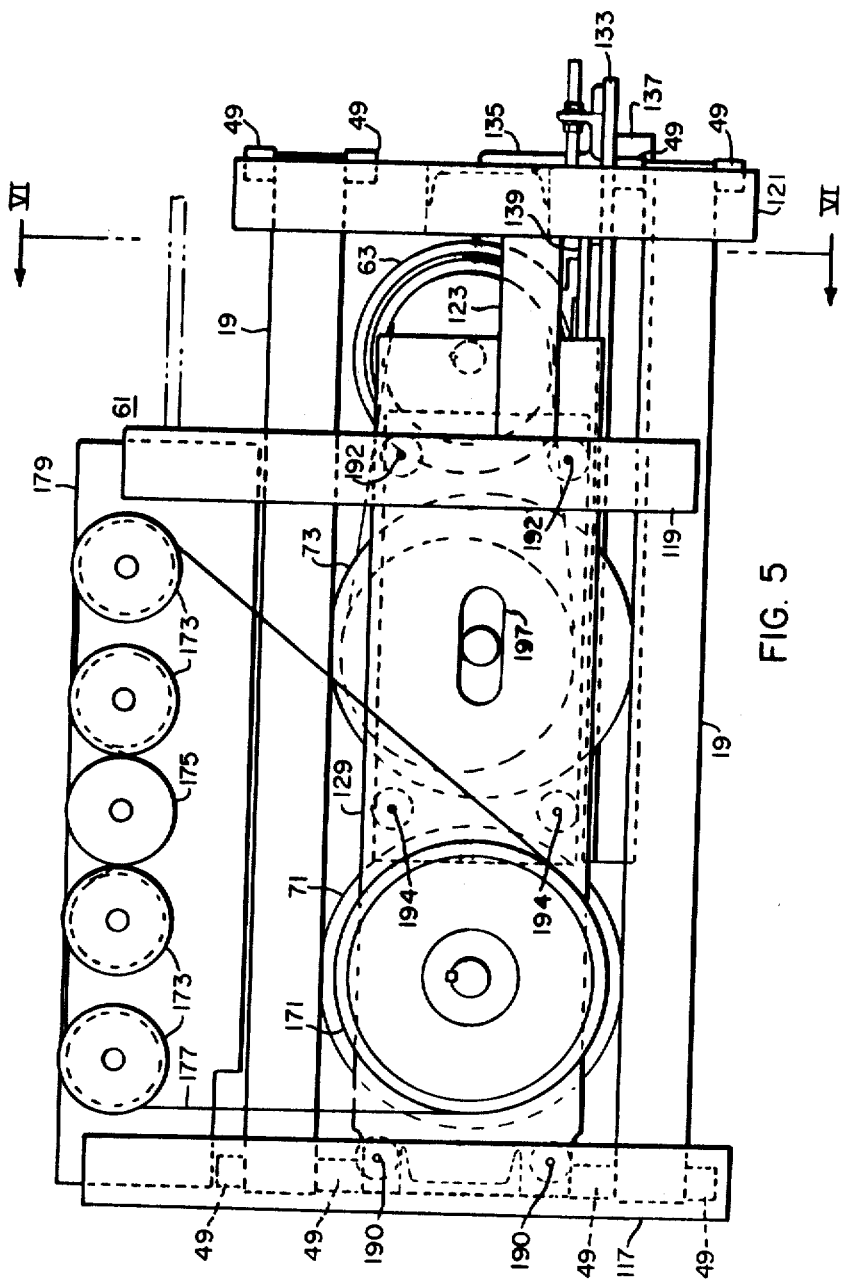
FIG. 5 is a side elevation view of the drive unit of FIG. 4.
Figure 6:
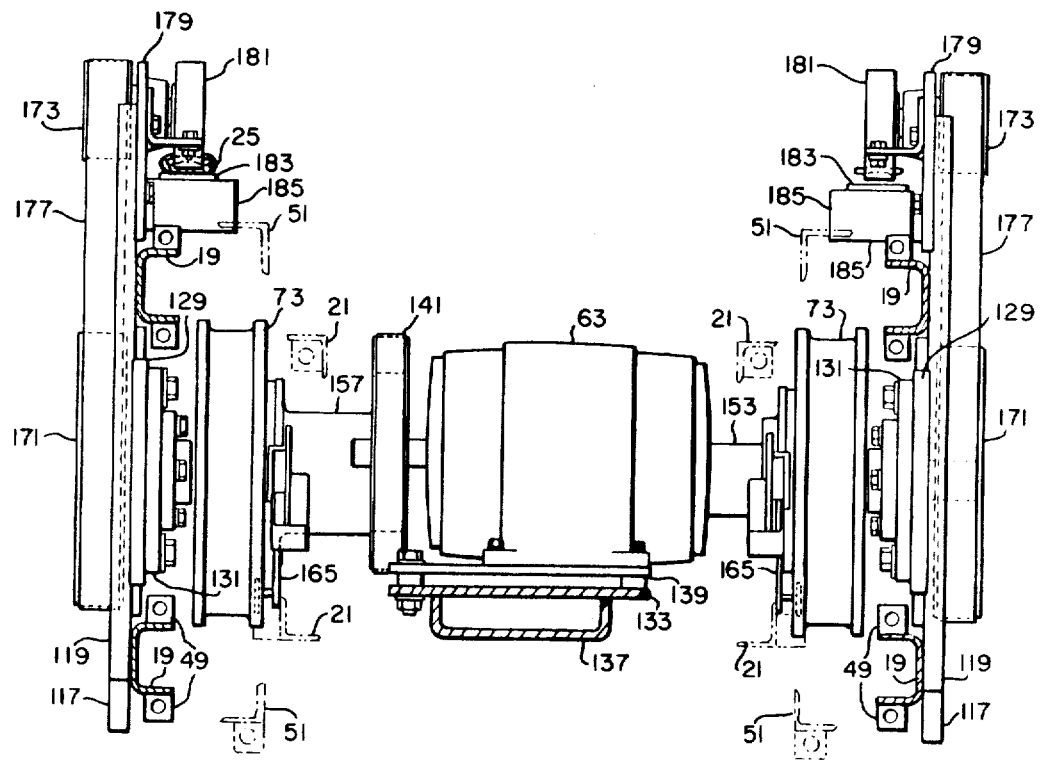
FIG. 6 is a vertical section taken along line VI—VI in FIG. 5.

FIGS. 4, 5 and 6 illustrate a compact modular drive unit according to the invention. The drive unit frame identified by the general reference character 61 includes upper and lower right-hand and left-hand longitudinal members 19 which are sections of the channel shaped main tracks illustrated in FIG. 1. Vertical bars 117, 119 and 121 are welded to the tracks to form rigid side members which are joined at either end by lateral channel members 125 and 127. The drive couplings 67 which include the driven sprocket wheels 71, the idler sprocket wheels 73 and a triple stranded chain 69 are connected to the respective sides of the frame 61 by main sprocket plates 129 which are bolted to the respective vertical supports 117 and 119 and by the idler sprocket plates 131 which are bolted to the main sprocket plates. This arrangement will be described in more detail later.

A drive unit mounting plate 133 is cantilevered from the lateral channel 127 by a bracket 135. The drive unit mounting plate 133 is reinforced by a channel 137 welded to the underside of the plate. A motor mounting plate 139 mounted on the drive unit mounting plate 133 supports the drive motor 63. This motor 63 is a standard commercial induction motor. A gear reducer 65 is bolted to the drive unit mounting plate 133 directly. The gear reducer is a commercial shaft mounted helical spur-gear type with an efficiency of over 98 percent and a continuous thermal rating equal to its mechanical rating. The gear reducer 65 is driven by the induction motor 63 through a timing belt 141 which connects the input pulley 145 on the reducer input shaft 147 to the drive motor pulley 143.

The gear reducer is provided with a hollow output shaft which received a slotted drive shaft 149. Set screw 151 couples the drive shaft to the hollow reducer shaft through a key (not shown). A radial flange 153 welded to one end of the drive shaft 149 is bolted to the driven sprocket 71 on one of the drive couplings. At the other end of the drive shaft, a second radial flange 157 with an axial slot cut through one side of the collar is slipped over the end of the drive shaft 149 and clamped in place by transverse bolts 159 which screw into tapped holes in the collar. The second radial flange 157 is then bolted to the drive sprocket 71 on the other drive coupling by bolts 155. With this arrangement, the drive unit including the drive motor and the gear reducer can be easily removed without disturbing the drive couplings once the modular drive unit has been inserted in the stairway. It should be noted at this point, that this arrangement also provides for maximum standardization of parts for the 32 inch and 48 inch standard width of stairways. The only change required is the length of the lateral channels 125 and 127 and the length of the drive shaft 149.

A standard caliber type brake 161 mounted on the gear reducer 65 acts on a brake disc 163 mounted to the input shaft of the gear reducer. This brake acts as the normal brake which is applied when the stairway is stopped intentionally and as an emergency brake which is applied if a malfunction occurs. Such malfunctions could include the failure of one of the triple stranded drive chains 69 or the timing belt 141. The triple stranded chains 69 are monitored by switches 165, while the timing belt is monitored by switch 167. Activation of one of these switches due to a break initiates application of the brake 161.

The gear reducer 65 provides a gear reduction ratio of approximately 36:1. This ratio along with the ratio of the other gearing permits the motor 63 to drive the steps of the moving stairway at the standard speeds of 90 or 120 feet per minute. A governor 169 on the motor shaft removes power and applies the brake if the motor should overspeed.

The modular drive unit incorporates a handrail drive similar to that disclosed in U.S. Pat. No. 3,414,109 issued in the name of M. A. Clark on Dec. 3, 1968. On either side of the unit, a handrail drive pulley 171 is mounted for rotation with the driven sprocket wheel 71. Auxiliary handrail drive pulleys 173 are driven by the pulley 171 through a drive belt 177. The belt 177 passes over the auxiliary handrail drive pulleys 173 and under the take-up pulley 175 which is vertically movable to adjust the tension on the drive belt 177. The auxiliary handrail drive pulleys 173 and pick-up pulley 175 are carried by the handrail mounting plate 179 bolted to the upper ends of the vertical supports 117 and 119. The auxiliary handrail drive pulleys 173 rotate drive rollers 181 located on the inside of the mounting plate 179 in line with the return run of the handrail. The drive rollers 181 impart a driving force to the handrail 25 as it is squeezed between the drive rollers and opposing tensioning rollers 183 carried in a roller cage 185 supported by the mounting plate 179.

Figure 7:
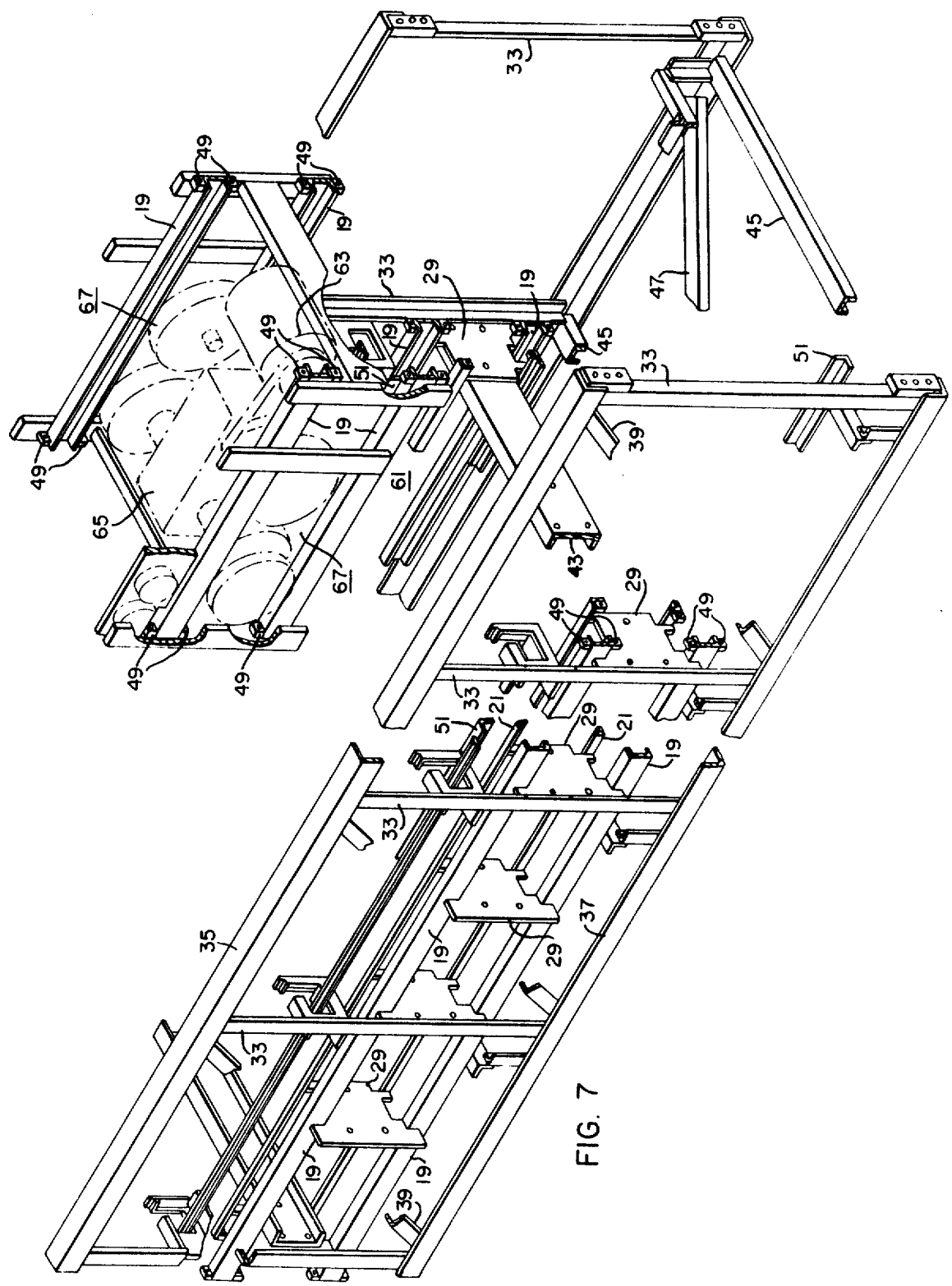
FIG. 7 is an exploded isometric view of a portion of the stairway of FIG. 1 showing how the drive unit shown in FIGS. 4, 5 and 6 is inserted into the stairway.

FIG. 7 illustrates how the modular drive unit may be inserted into the stairway shown schematically in FIG. 1. The stairway modules include upper and lower channel shaped main track members 19 on either side of the stairway which are rigidly aligned with respect to each other by precision templates 29. The templates also support the upper and lower trailer tracks 21 on either side of the stairway. A truss composed of longitudinal truss members 35 and 37, vertical truss members 33 and diagonal truss members 39 gives rigidity to the track assemblies. The two half sections of the stairway module are joined by the boxing members 43 with additional rigidity provided by the transverse channels 45 and diagonal channels 47. With all of the components precisely aligned with respect to the tracks, no field adjustment is necessary when the modules are joined in the field by bolts passing through the coupling blocks 49. In the stairway modules equipped with modular drive units, a portion of the main track is provided by the main track members 19 which form part of the frame 61 for the modular drive unit. In fact, the modular drive unit is supported in a stairway module by the main tracks 19 through the coupling blocks 49. With the drive couplings 61 precisely aligned with respect to the track sections 19 in the modular drive unit frame, they will also be aligned with the toothed links on the steps when the unit is installed. The sections of trailer tracks 21 passing through the drive units are installed individually.

Figure 8:
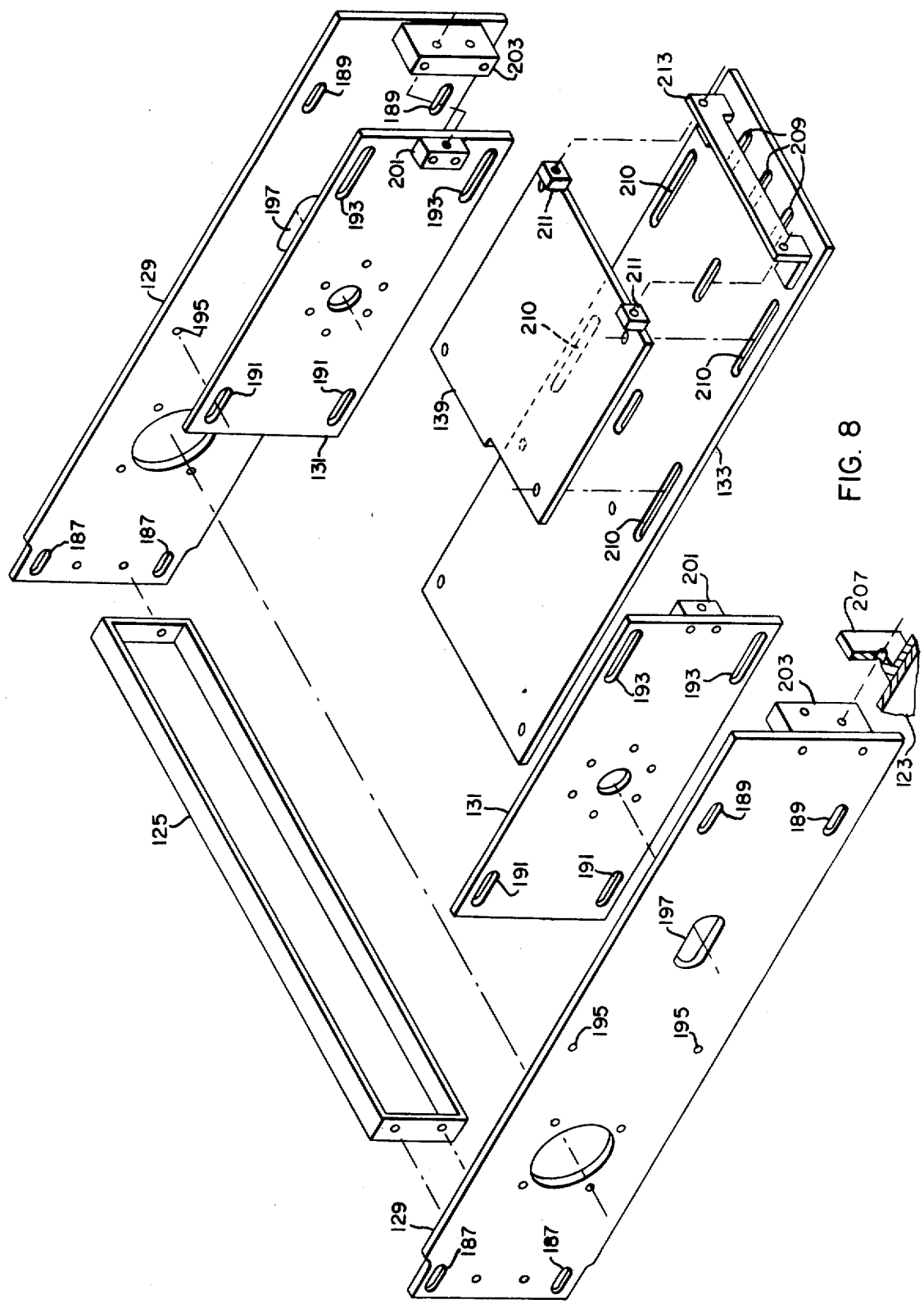
FIG. 8 is an exploded isometric view of some of the parts of the drive unit shown in FIGS. 4, 5 and 6.

When more than one modular drive unit is provided for a stairway as suggested previously, it is necessary to provide some means for longitudinal adjustment of the drive couplings so that all of the drive couplings can be made to register with the teeth on the links carried by the stairway. In order to provide this feature, the driven sprocket wheels 71 are bolted to the main sprocket plates 129. As seen best in FIG. 8, the main sprocket plates 129 are provided with horizontal slots 187 and 189 through which they are bolted to vertical supports 117 and 119 respectively of the drive unit frame by bolts 190 and 192 respectively (see FIG. 5). The idler sprocket wheels 73 are bolted to the idler sprocket plates 131. The sprocket plates 131 are fastened to the main sprocket plates 129 by pairs of bolts 194 passing through the holes 195 in plates 129 and slots 191 in plates 131, and by the bolts 192 passing through the slots 189 in plates 129 which also pass through the slots 193 in the plates 131 to clamp both plates to the vertical supports 119 of the frame. A slot 197 in the plates 129 accommodates for the axles of the idler sprocket wheels 73. By loosening the bolts 192 and 194, the idler sprocket plates 131 may be adjusted longitudinally with respect to the main sprocket plates 129 which in turn provides for adjustment of the longitudinal position of the idler sprockets 73 with respect to the drive sprockets 71 for adjusting the tension in the triple stranded chains 69. On the other hand, keeping the bolts 194 tightly fastened and loosening the bolts 190 in addition to the bolts 192, the two sprocket plates and therefore both sprocket wheels on either side may be moved as a unit to longitudinally adjust the position of the drive chain with respect to the frame and therefore with respect to the teeth on the links connected to the stairway. Since the lateral channel member 125 is connected to the main sprocket plates 129, the longitudinal adjustment of the two drive couplings is coordinated. In order to reduce the side loading on the bolts fastening the sprocket plates to the frame of the drive unit, tensioning bolts 199 (see FIG. 4) acting between blocks 201 on the idler sprocket plates 131 and blocks 203 on the main sprocket plates 129 and second tensioning bolts 205 acting between the blocks on the main sprocket plates 129 and angles 207 welded to the horizontal members 123 of the frame are provided.

The drive unit is also longitudinally adjustable. Slots 210 in the drive unit mounting plate 133 permit the gear reducer and drive motor to be moved longitudinally with respect to the drive unit mounting bracket 135. Since the gear reducer is connected to the drive sprockets 71 through the drive shaft 149 this drive unit mounting plate must be adjusted longitudinally whenever the drive couplings are adjusted. The slots 210 in the drive unit mounting plate 133 permit longitudinal adjustment of the position of the motor mounting plate 139 whereby the tension in the timing belt between the motor and the gear reducer can be adjusted. Blocks 211 on the motor mounting plate 139 and block 213 on the drive unit mounting plate 133 receive tensioning bolts 215 (see FIG. 4) which relieve some of the side load on the bolts clamping the motor plate to the drive unit plate. This arrangement for the longitudinal adjustment of the drive couplings together with the inherent slip characteristics of an induction motor make it practical to couple a number of modular drive units to a moving stairway.

In conclusion, a unique chain driving mechanism which engages a moving stairway on the load bearing and return run and which eliminates the need for slider beds has been described. The mechanism has been disclosed in a unique modular driving unit which incorporates sections of stairway track in its frame so that the unit may be easily and quickly installed and aligned in the stairway. The unit is designed for ease of maintenance and adjustment.

We claim as our invention:

1. In a combination for driving a conveyor of the endless belt type, an endless belt forming a loop having portions parallel to each other; a plurality of teeth carried by the endless belt along two spaced rows parallel to the direction of movement of the endless belt, a drive unit comprising first and second drive couplings for the first and second spaced rows of teeth, respectively, each of said drive couplings including two sprocket wheel means each having axially displaced rows of sprocket teeth and mounted for rotation about axes transverse to the path of the endless belt and longitudinally displaced from one another along the path of the endless belt, the corresponding sprocket wheel means on the first and second drive couplings being axially aligned, said sprocket wheel means being mounted with the teeth on the sprocket wheel means overlapping yet transversely displaced with respect to the teeth carried by said endless belt, first and second loops of multiple-strand driving chain for said first and second drive couplings, respectively, each of said loops having alternate strands engaged by the teeth of its associated row of teeth on the endless belt and the teeth on its associated sprocket wheel means, and motive means mounted within the loop of said endless belt between said first and second drive couplings, said motive means being operative to impart rotational movement to a pair of axially aligned sprocket wheel means to drive said endless belt through said drive coupling whereby the necessity for means independent of the sprocket wheels to lift the driving chains into engagement with the teeth carried by the endless belt is eliminated.

2. The drive unit of claim 1 wherein said sprocket wheel means each comprise a pair of axially displaced rows of sprocket teeth, wherein said mounting means positions said sprocket wheel means so that the sprocket teeth of each pair of rows straddle the teeth carried by said endless belt and wherein said multiple strand driving chain is a three strand chain with the side strands being engaged by the corresponding row of sprocket teeth on each sprocket wheel means while the center strand engages the teeth carried by the endless belt.

3. The combination of claim 2 wherein the teeth carried by the endless belt project inward toward the center of the loop formed by the endless belt, wherein the drive unit is located at a point where portions of said loop are parallel to each other, wherein the axes of the sprocket wheels are mounted halfway between the parallel portions of the loop and wherein the sprocket wheels are of such a diameter that the rows of teeth on the sprocket wheel means straddle the teeth carried by said endless belt on both of said parallel portions of the loop, whereby the center strand of the drive chain engages the endless belt on both portions of the loop formed by the endless belt.

4. In a combination for driving a conveyor of the endless belt type, an endless belt, a plurality of teeth carried by the endless belt along a line parallel to the direction of movement of the endless belt, a drive unit comprising a drive coupling including two sprocket wheel means each having axially displaced rows of sprocket teeth and mounted for rotation about axes transverse to the path of the endless belt and longitudinally displaced from one another along the path of the endless belt, said sprocket wheel means being mounted with the teeth on the sprocket wheel means overlapping yet transversely displaced with respect to the teeth carried by said endless belt, a loop of multiple-strand driving chain having alternate strands of said loop being engaged by the teeth on the endless belt and the teeth on the sprocket wheel means, said teeth carried by the endless belt being provided with a negative pitch angle whereby the driving chain is drawn into and retained in engagement with the teeth carried by the endless belt over the range of travel between the sprocket wheel means thus eliminating the need for a slider bed, and motive means operative to impart rotational movement to one of said sprocket wheel means to drive said endless belt through said drive coupling whereby the necessity for means independent of the sprocket wheels to lift the driving chain into engagement with the teeth carried by the endless belt is eliminated.

5. In a combination for driving a conveyor of the endless belt type, an endless belt forming a loop having parallel portions, a plurality of teeth carried by the endless belt along a line parallel to the direction of movement of the endless belt, said teeth projecting inwardly toward the center of the loop formed by the endless belt, a drive unit comprising a drive coupling including two sprocket wheel means each having a pair of axially displaced rows of sprocket teeth and mounted for rotation about axes transverse to the path of the endless belt and longitudinally displaced from one another along the path of the endless belt, mounting means mounting said sprocket wheel means with the teeth on the sprocket wheel means overlapping yet transversely displaced with respect to the teeth carried by said endless belt, such that the teeth of each pair of rows straddle the teeth carried by the endless belt, said drive unit including a frame, a first mounting plate mounted on said frame and reciprocally slidable with respect to said frame in the direction of movement of the endless belt, a second mounting plate mounted on and carried by said first mounting plate and reciprocally movable with respect to said first mounting plate in the direction of movement of said endless belt, a first one of said sprocket wheel means being rotatably mounted to the first mounting plate and the second sprocket wheel means being rotatably mounted to the second mounting plate, said drive unit being located at a point where portions of the loop formed by the endless belt are parallel to each other, wherein the axes of the sprocket wheel means are mounted halfway between the parallel portions of said loop, said sprocket wheels being of such a diameter that the rows of teeth on the sprocket wheel means straddle the teeth carried by said endless belt on both of said parallel portions of the loop, whereby the center strand of the drive chain engages the endless belt on both portions of the loop formed by the endless belt, a loop of three strand driving chain having the side strands of said loop engaged by the corresponding row of sprocket teeth while the center strand engages the teeth carried by the endless belt, and motive means operative to impart rotational movement to one of said sprocket wheel means to drive said endless belt through said drive coupling whereby the necessity for means independent of the sprocket wheels to lift the driving chain into engagement with the teeth carried by the endless belt is eliminated.

6. In a combination for driving a conveyor of the endless belt type, an endless belt, a plurality of teeth carried by the endless belt along a line parallel to the direction of movement of the endless belt, said teeth being arranged in two rows parallel to and equidistantly spaced on either side of the longitudinal axis of said endless belt, said teeth on the endless belt being provided with a negative pitch angle, a drive unit comprising a drive coupling for each of said rows of teeth carried by said endless belt, each drive coupling including two sprocket wheel means each having a pair of axially displaced rows of sprocket teeth, means mounting said sprocket wheel means for rotation about axes transverse to the path of the endless belt and longitudinally displaced from one another along the path of the endless belt, said sprocket wheel means being mounted with the teeth on the sprocket wheel means overlapping yet transversely displaced with respect to the teeth carried by said endless belt, such that the teeth of each pair of rows straddle the teeth carried by said endless belt, a loop of three strand driving chain having the center strand engaged by the teeth on the endless belt and the two side strands engaged by the teeth on the sprocket wheel means, and motive means operative to impart rotational movement to one of said sprocket wheel means in each drive coupling to drive said endless belt through said drive coupling whereby the necessity for means independent of the sprocket wheels to lift the driving chain into engagement with the teeth carried by the endless belt is eliminated.

7. In a combination for driving a conveyor of the endless belt type, an endless belt forming a loop having parallel portions, a plurality of teeth carried by the endless belt along a line parallel to the direction of movement of the endless belt, said teeth being arranged in two rows parallel to and equidistantly spaced on either side of the longitudinal axis of said endless belt, said teeth projecting inwardly toward the center of the loop, two drive units, each drive unit comprising a drive coupling for each of said rows of teeth carried by said endless belt, each drive coupling including two sprocket wheel means each having a pair of axially displaced rows of sprocket teeth and mounted for rotation about axes transverse to the path of the endless belt and longitudinally displaced from one another along the path of the endless belt, the corresponding sprocket wheel means on the two drive couplings being axially aligned with respect to each other, said sprocket wheel means being mounted with the teeth on the sprocket wheel means overlapping yet transversely displaced with respect to the teeth carried by said endless belt, such that the teeth of each pair of rows of the sprocket wheel means straddle the teeth carried by said endless belt, said drive unit being located at a point where portions of said loop are parallel to each other with one above the other, wherein the axes of the sprocket wheel means of both drive couplings are mounted halfway between the parallel portions of the loop and wherein said sprocket wheel means are of such a diameter that the rows of sprocket teeth straddle the teeth on the endless belt on both of the parallel portions of the endless belt, whereby the drive couplings engage the teeth on the endless belt on both the upper and lower runs on both sides, a loop of three strand driving chain having the center strand engaged by the teeth on the endless belt and the two side strands engaged by the teeth on the sprocket wheel means, and motive means mounted within the loop of the endless belt between the drive couplings, said motive means operative to impart rotational movement to one of said sprocket wheel means in each drive coupling to drive said endless belt through said drive coupling whereby the necessity for means independent of the sprocket wheels to lift the driving chain into engagement with the teeth carried by the endless belt is eliminated, said two drive units engaging and driving said endless belt on the top and bottom runs on both sides at two points, each of said drive units including a frame and a first pair of mounting plates mounted on either side of said frame and slidable with respect to said frame in the direction of movement of the endless belt, second mounting plates mounted on each of said first mounting plates and slidable with respect to the associated mounting plates in the direction of movement of the endless belt, first locking means for locking the first mounting plates in a selected position with respect to said frame, and second locking means for locking the second mounting plates in a selected position with respect to the first mounting plates, the driven sprocket wheel means in each drive coupling being rotatably mounted to the first mounting plate on the associated side of said frame and the undriven sprocket wheel means on each drive coupling being rotatably mounted to the corresponding second mounting plate whereby the drive couplings of one drive unit may be adjusted with respect to the corresponding drive couplings in the other drive unit by adjusting the positions of the first mounting plates of the one drive unit with respect to the associated frame so that the driving chains of both of the drive units can mesh with the teeth carried on the endless belt and whereby the slack in the drive chain in each drive coupling may be adjusted by adjusting the position of the associated second mounting plate with respect to the corresponding first mounting plate.

8. In a combination for driving a conveyor of the endless belt type, an endless belt forming a loop having parallel portions, a plurality of teeth carried by the endless belt along a line parallel to the direction of movement of the endless belt, said teeth being arranged in two rows parallel to and equidistantly spaced on either side of the longitudinal axis of said endless belt, said teeth projecting inwardly toward the center of the loop, a drive unit comprising a drive coupling for each of said rows of teeth carried by said endless belt, each drive coupling including two sprocket wheel means each having a pair of axially displaced rows of sprocket teeth and mounted for rotation about axes transverse to the path of the endless belt and longitudinally displaced from one another along the path of the endless belt, the corresponding sprocket wheel means on the two drive couplings being axially aligned with respect to each other, said sprocket wheel means being mounted with the teeth on the sprocket wheel means overlapping yet transversely displaced with respect to the teeth carried by said endless belt, such that the teeth of each pair of rows of the sprocket wheel means straddle the teeth carried by said endless belt, said drive unit being located at a point where portions of said loop are parallel to each other with one above the other, wherein the axes of the sprocket wheel means of both drive couplings are mounted halfway between the parallel portions of the loop and wherein said sprocket wheel means are of such a diameter that the rows of sprocket teeth straddle the teeth on the endless belt on both of the parallel portions of the endless belt, whereby the drive couplings engage the teeth on the endless belt on both the upper and lower runs on both sides, a loop of three strand driving chain having the center strand engaged by the teeth on the endless belt and the two side strands engaged by the teeth on the sprocket wheel means, and motive means mounted within the loop of the endless belt between the drive couplings, said motive means operative to impart rotational movement to one of said sprocket wheel means in each drive coupling to drive said endless belt through said drive coupling whereby the necessity for means independent of the sprocket wheels to lift the driving chain into engagement with the teeth carried by the endless belt is eliminated, said motive means including a reducer, shafts for connecting said reducer to corresponding sprocket wheel means in the two drive couplings, and releasable connections in the shafts connecting said reducer to the selected sprocket wheels whereby said motive means can be removed by releasing the releasable connections without disturbing the drive couplings.

9. The combination of claim 8 wherein said shafts connecting the reducer to the sprocket wheel means each comprise two axially aligned shafts and wherein the releasable connections include a radial flange fixedly connected to the end of one shaft, a second radial flange slidably fitted on the end of said second shaft, said second radial flange having a collar with an axially aligned slot therethrough and an aperture transverse to the axis of a shaft through the slotted portions of said collar, adjustable fasteners inserted in said aperture and operative to apply a clamping force to said slotted collar to cause it to rigidly grip the second shaft and axially aligned adjustable fasteners operative to clamp the two flanges to the associated sprocket wheels in the drive couplings.

10. In a combination for driving a conveyor of the endless belt type, an endless belt, a plurality of teeth carried by the endless belt along a line parallel to the direction of movement of the endless belt, said teeth being arranged in two rows parallel to and equidistantly spaced on either side of the longitudinal axis of said endless belt, a drive unit comprising a drive coupling for each of said rows of teeth carried by said endless belt, each drive coupling including two sprocket wheel means each having a pair of axially displaced rows of sprocket teeth and mounted for rotation about axes transverse to the path of the endless belt and longitudinally displaced from one another along the path of the endless belt, said sprocket wheel means being mounted with the teeth on the sprocket wheel means overlapping yet transversely displaced with respect to the teeth carried by said endless belt, such that the teeth of each pair or rows of the sprocket wheel means straddle the teeth carried by said endless belt, a loop of three strand driving chain having the center strand engaged by the teeth on the endless belt and the two side strands engaged by the teeth on the sprocket wheel means, motive means operative to impart rotational movement to one of said sprocket wheel means in each drive coupling to drive said endless belt through said drive coupling whereby the necessity for means independent of the sprocket wheels to lift the driving chain into engagement with the teeth carried by the endless belt is eliminated, handrails in the form of additional endless belts one on either side of said endless belt, said handrails having an upper run which serves as a support for passengers on the endless belt and a return run adjacent said endless belt, and roller drive means on either side of said endless belt for engaging and driving the associated handrail and coupling means for coupling the roller drive means on each side of the endless belt to the driven sprocket wheel means in the corresponding drive coupling.

11. In a combination for driving a conveyor of the endless belt type, an endless belt, a plurality of teeth carried by the endless belt along a line parallel to the direction of movement of the endless belt and a drive unit comprising a drive coupling including two sprocket wheel means each having a pair of axially displaced rows of sprocket teeth and mounted for rotation about axes transverse to the path of the endless belt and longitudinally displaced from one another along the path of the endless belt, said sprocket wheel means being mounted with the teeth on the sprocket wheel means overlapping yet transversely displaced with respect to the teeth carried by said endless belt, such that the teeth of each pair of rows straddle the teeth carried by the endless belt, a loop of three strand driving chain having the center strand engaged by the teeth on the endless belt and the two side strands engaged by the teeth on the sprocket wheel means, said center strand of the three strand drive chain having a pitch which differs from that of said side strands, and motive means operative to impart rotational movement to one of said sprocket wheel means to drive said endless belt through said drive coupling whereby the necessity for means independent of the sprocket wheels to lift the driving chain into engagement with the teeth carried by the endless belt is eliminated.

12. The combination of claim 11, wherein the pitch of the center strand of the drive chain is twice the pitch of the side strands, wherein the pitch of the teeth on said endless belt is substantially the same as the pitch of the center strand of the drive chain and wherein the center strand of the drive chain is provided with rollers of resilient material whereby the center strand will accommodate to distribute the driving force over a plurality of teeth on the endless belt.

13. The combination of claim 12, wherein the teeth carried by the endless belt are provided with a negative pitch angle.

14. In a combination for driving a conveyor of the endless belt type, an endless belt, a plurality of teeth carried by the endless belt along a line parallel to the direction of movement of the endless belt and a drive unit comprising a drive coupling including two sprocket wheel means each having a pair of axially displaced rows of sprocket teeth and mounted for rotation about axes transverse to the path of the endless belt and longitudinally displaced from one another along the path of the endless belt, said sprocket wheel means being mounted with the teeth on the sprocket wheel means overlapping yet transversely displaced with respect to the teeth carried by said endless belt, such that the teeth of each pair of rows straddle the teeth carried by the endless belt, said sprocket wheel means each including a drum having two axially displaced rows of sprocket teeth extending radially from the periphery thereof, a loop of three strand driving chain having the center strand engaged by the teeth on the endless belt and the two side strands engaged by the teeth on the sprocket wheel means, the pitch of the center strand of the drive chain and the teeth on said endless belt being twice the pitch of the sprocket teeth and the side strands of the driving chain, said driving chain including rollers in each strand with the rollers of the center strand being resilient rollers having a diameter substantially larger than the rollers on the side strands of the drive chain, said drum having an annular groove in its periphery between the rows of sprocket teeth, said groove being adequate to accommodate the larger diameter rollers on the center strand of the driving chain, and motive means operative to impart rotational movement to one of said sprocket wheel means to drive said endless belt through said drive coupling whereby the necessity for means independent of the sprocket wheels to lift the driving chain into engagement with the teeth carried by the endless belt is eliminated.

15. The combination of claim 14 wherein the dedendum of the teeth carried by the endless belt is undercut to provide a negative pitch angle on said teeth.

16. The combination of claim 15 wherein the negative pitch angle is on the order of 5°.

17. In combination, an endless belt, a row of teeth carried by the endless belt along a line parallel to the direction of movement of the endless belt, and a plurality of drive units engaging said row of teeth carried by said endless belt at a plurality of points for driving said endless belt in its endless path, each of said drive units comprising a frame, a first mounting plate mounted on said frame and reciprocally slidable with respect to said frame in the direction of movement of the endless belt, a second mounting plate mounted on and carried by the first mounting plate and reciprocally movable with respect to said first mounting plate in the direction of movement of said endless belt, first locking means for locking said first mounting plate in a selected position with respect to said frame, second locking means for locking in the second locking mounting plate in a selected position with respect to said first mounting plate, a first sprocket wheel rotatably mounted on and carried by said first mounting plate, a second sprocket wheel rotatably mounted on and carried by said second mounting plate, and a drive chain supported and driven in a loop by said first and second sprocket wheels with a portion of said loop in engagement with the teeth carried by said endless belt whereby the drive chain of one drive unit may be adjusted with respect to the drive chain in another drive unit by adjusting the position of the first mounting plate of the one drive unit with respect to the corresponding frame so that the driving chains of both of the drive units can mesh with the teeth carried on the endless belt and whereby the slack in the drive chain in each drive unit may be adjusted by adjusting the position of the associated second mounting plate with respect to the corresponding first mounting plate.

18. The combination of claim 17, wherein said endless belt is arranged with an upper load bearing run and a lower return run with portions of said runs parallel to each other and wherein portions of said loops in said drive chains engage the teeth carried by said endless belt in both the load bearing and return runs.

19. The combination of claim 17, including a second row of teeth carried by the endless belt along a line parallel to the direction of movement of said endless belt, said rows of teeth being equidistantly spaced on either side of the longitudinal axis of said endless belt, a pair of said first mounting plates mounted one on either side of said frame and reciprocally slidable with respect to said frame in the direction of movement of the endless belt, a pair of said second mounting plates mounted one on each of said first mounting plates and reciprocally slidable with respect to the corresponding first mounting plate in a direction of movement of said endless belt, first locking means for locking each of said first mounting plates in a selected position with respect to said frame, second locking means for locking each of said second mounting plates in a selected position with respect to the corresponding first mounting plate, a pair of first sprocket wheels one rotatably mounted on and carried by each of said first mounting plates, a pair of second sprocket wheels one rotatably mounted on and carried by each of said second mounting plates, and a pair of drive chains each one supported and driven in a loop by one of said first and second sprocket wheels with a portion of each of said loops in engagement with one of said rows of teeth carried by the endless belt.

* * * * *